(12) United States Patent
Day et al.

(10) Patent No.: US 10,430,453 B1
(45) Date of Patent: Oct. 1, 2019

(54) IDENTIFYING ALTERNATE CONTENT DISTRIBUTION LOCATIONS

(71) Applicant: Google LLC, Mountain View, CA (US)

(72) Inventors: Robert F. Day, Bellevue, WA (US); John W. L. Merrill, Redmond, WA (US); Joerg Heilig, Los Altos, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 15/669,227

(22) Filed: Aug. 4, 2017

Related U.S. Application Data (63) Continuation of application No. 12/570,729, filed on Sep. 30, 2009, now Pat. No. 9,754,285.

(51) Int. Cl.
| | | |
|---|---|---|
| *G06Q 30/02* | (2012.01) | |
| *G06F 16/435* | (2019.01) | |
| *G06F 16/332* | (2019.01) | |
| *G06F 16/9535* | (2019.01) | |

(52) U.S. Cl.
CPC ....... *G06F 16/437* (2019.01); *G06Q 30/0251* (2013.01); *G06F 16/3325* (2019.01); *G06F 16/9535* (2019.01); *G06Q 30/0277* (2013.01)

(58) Field of Classification Search
None
See application file for complete search history.

(56) References Cited

U.S. PATENT DOCUMENTS

| | | | |
|---|---|---|---|
| 5,668,988 A | 9/1997 | Chen et al. | |
| 7,809,801 B1 * | 10/2010 | Wang ................ | G06Q 30/0255 709/217 |
| 2002/0072971 A1 * | 6/2002 | DeBusk ............. | G06Q 30/02 705/14.41 |
| 2006/0095322 A1 * | 5/2006 | Dierks ............... | G06F 17/30616 705/14.46 |
| 2011/0041168 A1 | 2/2011 | Murray et al. | |

* cited by examiner

*Primary Examiner* — Patricia H Munson
(74) *Attorney, Agent, or Firm* — Fish & Richardson P.C.

(57) ABSTRACT

A selected target location is used as a basis for selecting an alternate target location for distribution of content. The alternate target location is selected based on historical information about user activity involving the selected target location and may include an analysis of time records associated with locations included in the historical data.

20 Claims, 3 Drawing Sheets

IDENTIFYING ALTERNATE CONTENT DISTRIBUTION LOCATIONS

CROSS-REFERENCE TO RELATED APPLICATIONS

This application is a continuation application of and claims priority to U.S. application Ser. No. 12/570,729, filed on Sep. 30, 2009, the entire contents of which are hereby incorporated by reference.

TECHNICAL FIELD

This disclosure relates to content distribution.

BACKGROUND

In many different environments, content providers want to distribute content to selected locations. For example, advertisers want to distribute their advertisements to locations where the advertisements will be effective in communicating information to receptive recipients, and at times when the advertisements will lead to desired activity, such as a purchase of the advertiser's goods or services. In some instances, a content provider may rely on contextual information when making decisions regarding content distribution location selections. For example, an advertiser may want to advertise goods and/or services relating to travel in locations where information of general interest to travel enthusiasts is available. In some instances, a content provider may rely on targeting information, such as demographics, when making decisions regarding content distribution location selection. Additionally, such decisions can be influenced by information regarding previous content distribution location selections, and the attendant effects of such previous selections.

SUMMARY

In some instances, a content provider may wish to identify alternate locations for content distribution based on a first selected location. For example, an advertiser may wish to identify, based on distribution of advertisements to a first location, other locations for advertisement distribution that will improve the effect of the advertisements. In another example, an advertiser may wish to divert potential customers from visiting a location where a competitor distributes advertisements, or where a competitor offers goods and/or services. In another example, a desired location selected by a content provider may not be available for distribution of selected content, such as where a selected location is unavailable because the location is reserved for other content, or because the cost of distributing the content to the location is more than the content provider is willing to pay. In yet another example, visitation of a first location may be considered to be indicative of receptiveness to selected content, such that in addition to, or in lieu of, distributing content to the first location, a content provider may wish to distribute the selected content to other locations that are frequently visited before or after the first location. Thus, a first selected location, referred to as a target location, regardless of whether the target location is also a candidate location for distribution of content, can be used as a basis for identifying and selecting an alternate location for distribution of the content.

In one general aspect, selecting a location for placement of content includes identifying a first target location, selecting, by one or more processor, an alternate target location for placement of the content based on analysis of historical information about activity involving locations including the first target location, and outputting the alternate target location as a selected location for placement of the content. The historical information can be updated, an updated alternate location can be selected based on the updated historical information, and the updated alternate location can be output as the selected location for placement of the content.

Implementations may include one or more of the following features. For example, the historical information about activity involving the first target location can include multiple traversals, where each traversal includes a time-ordered sequence of locations. The first target location can include a selected location, a group of selected locations and/or at least one zone that includes multiple locations including a selected location or group of selected locations. The historical information about activity involving the first target location can be identified based on a traversal that includes a location from a group of locations, the group of locations including the first target location. The locations included in the traversals can have associated time values, and selecting the alternate location can include, for each traversal belonging to a group of traversals, comparing a time value associated with the first target location to the time values associated with other locations of the traversal. Identifying the first target location can include receiving an indication of a selected location that is not available for content distribution. Identifying the first target location can include receiving an indication of a selected location on a competitor's web site. The historical information about activity involving the first target location can be updated, a second alternate target location can be selected, and the second alternate target location can be output as the selected location for placement of the content. The historical information can be received from a client computer program product stored on a user computer. The historical information can include a moving window of historical information. The content can be an advertisement.

Selecting the alternate target location can include identifying historical information about activity involving the first target location from a repository of historical information. Selecting the alternate target location can also include performing a statistical analysis of the historical information about activity involving the first target location. Selecting the alternate target location can also include comparing a time value associated with the first target location to a time value associated with another location. Selecting the alternate target location can also include comparing a time value associated with the first target location in a first traversal with a time value associated with another location in the first traversal. The alternate location can be selected from among locations of a group of locations, with the group of locations being selected from a group of locations having an associated time before an associated time of the first target location, and a group of locations having an associated time after an associated time of the first target location. Selecting the alternate target location can include a ranking analysis.

In another general aspect, selecting an alternate target location to which to distribute content includes building an index including traversals, each traversal of which includes a time-ordered sequence of locations, identifying a first target location, identifying, by one or more processor, a group of traversals from among the traversals, each traversal of which includes the first target location, and selecting, by one or more processor, the alternate target location for the content based on an analysis of the traversals of the group of traversals.

In another general aspect, selecting a location to which to deliver an advertisement includes collecting, in a web usage history repository, time-ordered sequences of locations representing a web usage history of an entity over a period of time, and selecting, by one or more processor, a location to which to deliver an advertisement based on an analysis of the time-ordered sequences of locations.

In another general aspect, delivering an advertisement to a location includes selecting, by one or more processor, a location based on an analysis of a time-ordered sequence of location that represents a web usage history of an entity over a period of time, and delivering the advertisement to a user in response to the user requesting content associated with a web page comprising the location.

In another general aspect, a system for selecting a location for placement of content includes a communication device configured to receive information regarding a first target location and output an alternate target location as a selected location for placement of the content and an analysis unit configured to select the alternate target location based on analysis of historical information about activity involving locations including the first target location. The system can also include a repository of historical information including a plurality of traversals, each traversal including a time-ordered sequence of locations, wherein the analysis unit is configured to select the alternate location from among the locations included in the traversals that also include the first target location.

The details of one or more implementations are set forth in the accompanying drawings and the description below. Other features will be apparent from the description and drawings, and from the claims.

DESCRIPTION OF DRAWINGS

Like reference symbols in the various drawings indicate like elements.

DETAILED DESCRIPTION

Figure 1:
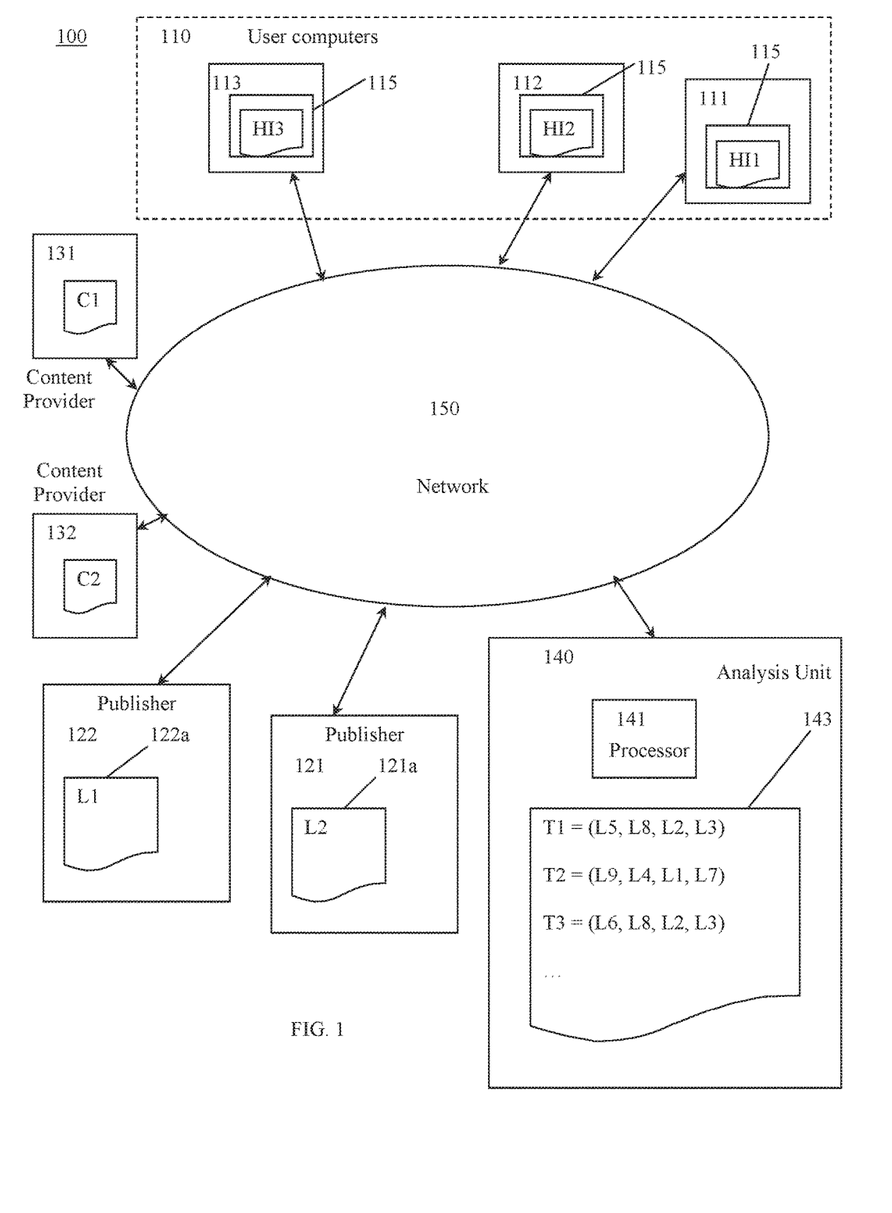
FIG. 1 is an illustration of an example system for distributing content.

Referring to FIG. 1, a system 100 for distributing content includes user computers 110 (including individual user computers 111, 112, and 113), publishers 121 and 122, content providers 131 and 132, and an analysis unit 140, all of which are operable with a network 150, such as the Internet. Each of the user computers 111, 112, and 113, the publishers 121 and 122, the content providers 131 and 132, and the analysis unit 140 includes an input/output device in the form of a communication device operable with the network 150 via an associated communication link.

The publishers 121 and 122, among others, may include web pages 121a and 122a, or other sources of content, that are accessible at locations L1 and L2, respectively. The publishers 121 and 122 may include content from other content providers, such as content providers 131 and 132, who provide content C1 and C2, respectively. Content providers 131 and 132 may be advertisers who sponsor distribution of the content C1 and C2 in the form of advertisements on pages of websites, such as web pages 121a and 122a accessible at the locations L1 and L2.

Figure 2:
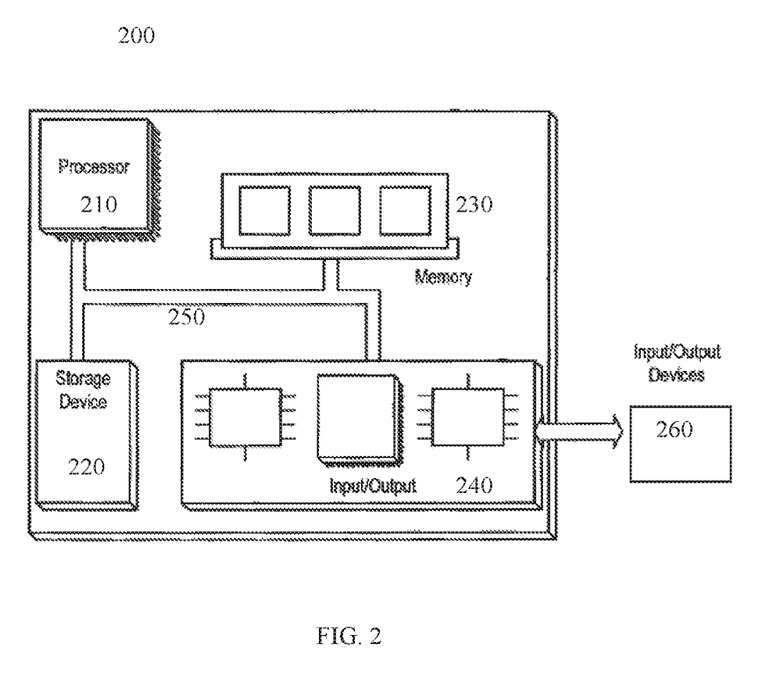
FIG. 2 is a diagram illustrating an example computer system operable in the system of FIG. 1.

Referring also to FIG. 2, a computer 200 can be used to implement any of the user computers 111, 112, and 113, the publishers 121 and 122, the content providers 131 and 132, and the analysis unit 140. Computer 200 includes a processor 210, a storage device 220, a memory module 230, an input/output module 240, and a system bus 250. The input/output module 240 is operable with one or more input/output devices 260. The computer 200 may take the form of a general purpose computer, such as a personal desktop computer or a laptop computer, a server computer, a mobile device, such as a cell phone or a personal digital assistant, a video game console, a set top box, a digital video recorder, or other device that is operable with the network 150.

Each of the user computers 111, 112, and 113 also includes an input/output device 260 in the form of a display device operable to display a graphical user interface to a user, and may include one or more programs, such as an operating system and an Internet browser, stored, for example, on the storage device 220. The user computers 111, 112, and 113 may additionally include a client program 115 stored, for example, on the storage device 220, which is operable to store historical information about activity, and to transmit the historical information to the analysis unit 140. The user computers 111, 112, and 113 store and transmit the historical information HI1, HI2, and HI3 to the analysis unit 140. The historical information includes, for example, information regarding a current location visited by the respective user computer and a time of the visit. When received by the analysis unit 140, the historical information can be used to create traversals T1, T2, and T3 for each of the user computers 111, 112, and 113, respectively. The traversals T1, T2, and T3 may each include, for example, a time-ordered list of locations, such as online destinations corresponding to activity of one or more Internet browser session, or other activity of the user computers 111, 112, and 113. The historical information can refer to such locations using Internet addresses, web page URLs, or other identifiers. As illustrated, the user computer 111 was used to access a first location L5 at a first time, a second location L8 at a second time, a third location L2 at a third time, and a fourth location L3 at a fourth time. Each of the traversals T1, T2, and T3 may be limited in duration, and may store information of locations having associated time information only within a pre-defined window from a current time. For example, each of the traversals T1, T2, and T3 may only store information for locations having associated time information within 10 days of the current time. Thus, each traversal may comprise a moving window of historical information.

Figure 3:
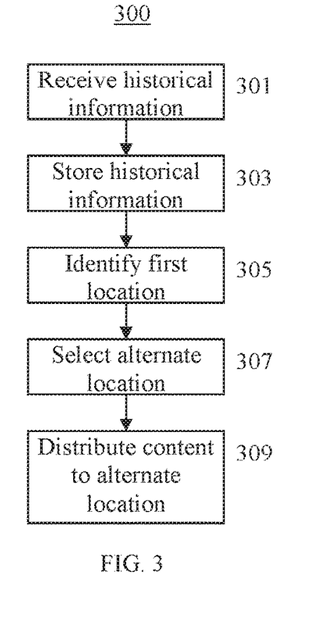
FIG. 3 is a flow chart illustrating an example process for distribution of content.

Referring to FIG. 3, a process 300 may be implemented to distribute content to an alternate location. The process 300 begins when the client program 115 transmits the historical information to the analysis unit 140. The historical information may be transmitted to the analysis unit 140 periodically, such as once per day, whenever new historical information is available, such as during or after a browser session, or at other times or at other time intervals. The analysis unit 140 receives the historical information (301) from each of the user computers 111, 112, and 113, and stores the historical information (303) in a collection 143 for analysis by a processor 141. In some implementations, the historical information is information about a current location visited by the user computer, and the historical information can be stored as a traversal. In other implementations, the historical information can be stored as a traversal by the client program 115 and the traversal can be transmitted to the analysis unit 140.

In some implementations, a content provider, such as the content provider 131, who wants to sponsor placement of an advertisement in the form of the content C1 at the location L3, but is unable to do so, may want to identify an alternate location for distribution of the content C1 to substitute for the location L3. For example, a content provider who wants to divert user traffic from a landing page offering a competitor's goods or services may want to identify an alternate landing site to the landing page. In some implementations, the content provider 131 may already sponsor placement of the content C1 on the location L3, and may want to identify an alternate location on which to additionally distribute the content C1. For example, a content provider whose advertisements have been very successful at a particular website may want to identify an additional website that is likely to produce similar successes and/or reinforce the successes of the advertisements at the particular website. In another example, the content provider 131 may want to advertise at a location L3 on a competitor's website, but is unable to do so because the competitor bars advertisements from the content provider. In this case, the content provider 131 may want to identify an alternate landing site to the competitor's website.

In these cases, or in other cases, the content provider 131 may transmit an indication of a first candidate target location, such as the location L3 (e.g., the landing page offering a competitor's goods in the example above). The analysis unit 140 identifies a first location (305) based on the indication of the first target location. Alternatively, the content provider 131 may transmit criteria for selection of a first target location, such as price information, required or desired characteristics of a target location, or other information, and the analysis unit 140 may identify the first target location (305) based on a comparison of the criteria and information about locations for which historical information is available. Based on historical information stored in the collection 143 that includes activity that involves the first target location, the analysis unit 140 selects an alternate location (307). For example, analysis of the historical information in the form of traversals T1, T2, and T3 stored in the collection 143 may reveal that locations L2 and L8 are frequently visited before visiting the first candidate target location L3, and the analysis unit 140 may select the location L2, the location L8, or both the locations L2 and L8 as the alternate location.

An indication of the alternate location is provided to the content provider 131, and the content provider 131 may distribute the content C1 at the alternate location (309), such as by sponsoring placement of an advertisement on a web page that is associated with the alternate location. In order to facilitate distribution of the content C1 at the alternate location, the analysis unit 140 may be operable with a system for distribution of content, such as an auction or reservation system for advertisements.

Figure 4:
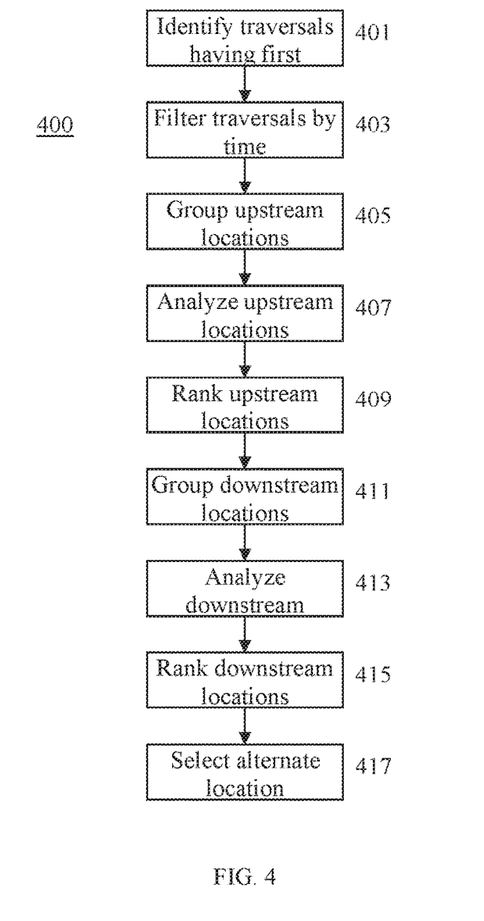
FIG. 4 is a flow chart illustrating an example process for selection of an alternate target location for content distribution.

Referring to FIG. 4, a process 400 for selecting an alternate location may be performed in association with the content distribution process 300 as all or part of the selection of the alternate target location (307). Initially, the process 400 involves identifying each traversal of the collection 143 that includes a first target location (401), such as the first target location identified in process 300, or identifying each traversal that includes one or more locations from a group of locations, or a zone that includes multiple locations, such as a website that includes multiple web pages. In other implementations, the first target location can include two or more locations, and only traversals including all of the two or more locations can be identified. Similarly, a specific order, time proximity, or other criteria can be used to identify relevant traversals. Thus, process 400 reduces the number of traversals for analysis to a subset of all the traversals stored in the collection 143 by ignoring those that do not contain the first target location, or that do not meet other criteria. This may reduce a time and/or computing power necessary to perform the selection process 400.

Each traversal of the subset of traversals that includes the first target location is filtered based on a time value associated with the first target location (403). For example, returning to the example above, if a traversal includes the competitor's website, or a specific page of the competitor's website, a time at which the competitor's website was visited is used as a reference time, and all locations visited more than a predetermined time before or after the reference time are ignored. Thus, for each traversal that includes the first target location, all locations that have an associated time value that differs from the time value associated with the first target location in the traversal by more than a predetermined threshold amount may be filtered such that those locations are not considered for further analysis. Accordingly, only locations that were visited within the predefined threshold amount of time before or after the first target location was visited may be considered as candidate alternate locations. This too may reduce the time and/or computing power necessary to perform the selection process 400, and may additionally avoid selection of a location that is too remotely associated with the first target location.

It is important to note, however, that the predetermined threshold amount of time used in the filtering can be selected based on contextual information, including predicted or anticipated behavior of customers, or other consumers of content. For example, where a high value durable good, such as an automobile, is advertised, an advertiser may select a relatively long period of time for the filter, such as ten days or more. This selection may be made based in part on a belief that automobile sales result from many days of research and deliberation, such that selection of a short period of time for the filter may preclude selection of suitable alternate locations that may allow the advertiser to provide information to the consumer earlier in the automobile purchase process. Similarly, where an advertiser seeks to promote an impulse purchase, or where for any reason the advertiser prefers to place advertisements only at locations visited in close proximity to the first target location, the advertiser can select a relatively short amount of time, such as one hour or less. Additionally, minimum threshold time values may be used. For example, minimum threshold times may be used to remove locations visited closer in time to the first target location than the minimum threshold time value.

The locations of each traversal that include associated time information within the predefined period from the time associated with the first target location may then be grouped into locations visited before the first target location (405). The locations visited before the first target location may be combined or associated to provide a group of upstream candidate alternate locations. The alternate target location may be selected from the upstream candidate alternate locations when diversion from the first target location is desired, or when the content provider wants to provide the content to a user at a location previously visited by users in advance of visiting the first target location.

The upstream group of candidate alternate locations may be analyzed to determine statistical information regarding each location of the upstream group (407). For example, an analysis of the number of times each location appears before the first target location and within the time period may be performed to generate statistics about each candidate alternate target location. Additionally, other targeting information can be used in analyzing the candidate alternate locations, such as demographic information, interest information, or other information known about users whose activity is reflected by the traversals. For example, the content provider can indicate that male users are to be targeted, and only traversals associated with male users can be analyzed. The candidate alternate target locations may then be ranked based on the statistics (409). For example, a decay function may be applied to the historical information such that locations that are visited more closely in time to the first target location are weighted more than locations that are visited more remotely in time to the first target location, but still within the predefined period. Alternatively, such as where the minimum threshold value is used in filtering, a decay function may be applied to the historical information such that locations that are visited more closely in time to a predetermined time are weighted more than time that are more remote from the predetermined time. The predetermined time can be defined by the time of the first target location, plus or minus a selected amount of time. Furthermore, the ranking can be based on other criteria, such as a determination of similarity of the locations to the first target location.

The locations of each traversal that include associated time information within the predefined period from the time of the first target location may then be grouped into locations visited after the first target location (411). The locations visited after the first target location may be grouped to provide a group of downstream candidate alternate locations. Because the groups are formed from traversals of many different users, each of whom may have different browsing or location visitation patterns (or no pattern at all), each location may be included in one or both of the upstream group and the downstream group. The alternate target location may be selected from the downstream candidate alternate locations when the content provider wants to provide the content to a user who visited the first target location in advance of visiting the alternate target location. For example, the content provider may wish to have a second chance to provide the content to the user in situations in which the user's visit to the first target location did not produce a desired result. Additionally, the alternate target location may be selected from the downstream candidate alternate locations when the content is intended to supplement an activity or information associated with the first target location, such as the sale of an add-on product or an accessory for a product purchased at the first target location.

The downstream group of candidate alternate locations may be analyzed to determine statistical information regarding each location of the downstream group (413). For example, an analysis of the number of times each location appears after the first target location and within the time period may be performed to generate statistics about each candidate alternate target location.

The candidate alternate target locations may then be ranked based on the statistics (415). For example, a decay function may be applied to the historical information such that locations that are visited more closely in time after the first target location are weighted more than locations that are visited more remotely in time after the first target location, but still within the predefined period.

A selection of one or more alternate target location may then be made based on the rankings of the candidate alternate locations from the upstream group and the downstream group (417). Additionally, the selection may be based on additional information, such as a price threshold, a location preference, a threshold statistic value, or based on other information. Alternatively, the selection may be based on a different statistical analysis of the candidate alternate locations, and/or on different ranking criteria. For example, the statistical analysis may include analysis of the number of locations within a zone of locations, such as a number of pages in a website that were visited before (or after) the target location. The ranking may be based in part on a cost of distribution of the content on the location to obtain a ranking of candidate alternate locations by cost efficiency.

The selection process 400 may be performed multiple times to select an alternate target location and to update the selected alternate target location based on updated historical information of activity involving the first target location. For example, the process 400 may be performed on demand and or periodically, such as when new historical information is added to the collection 143. Thus, the selection process 400 may be used in a dynamic content distribution campaign.

Figure 5:
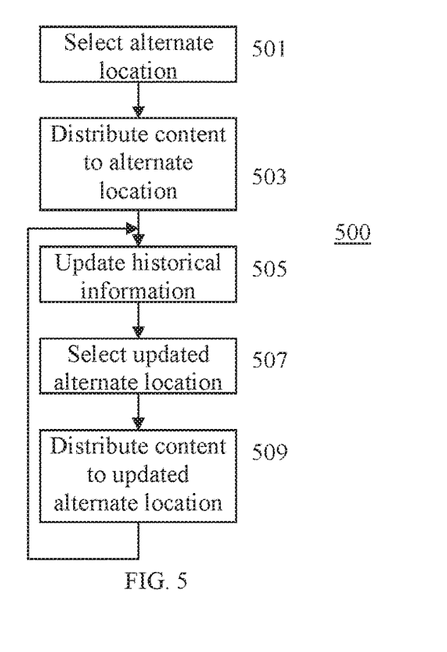
FIG. 5 is a flow chart illustrating an example process for dynamic distribution of content.

Referring to FIG. 5, a content distribution process 500 includes selection of an alternate target location (501), which may include the selection process 400, or a variant thereof. The content is then distributed to the selected alternate location at a first time (503), or during a first time period.

The historical information on which the selection was based is updated (505) based on newly collected or received historical information, which may include updating the collection 143. After the historical information has been updated, an updated alternate location is selected (507) based on the updated historical information, and the content is then distributed to the updated alternate location at a second time (509), or during a second time period. The process 500 then returns to update the historical information (505) based on newly collected or newly received historical information. Additionally or alternatively, the selection of an updated alternate location (507) may be performed based on updated selection criteria, when such criteria are received.

A number of implementations have been described. Nevertheless, it will be understood that various modifications may be made without departing from the spirit and scope of the claims. For example, while the selection process has been described with reference to historical usage information, statistical analysis, and ranking, the selection process may additionally include consideration of behavioral considerations, such as behavioral statistics. Additionally, the first target location, and/or the selected alternate location may comprise zones including multiple locations, such as multiple pages of a publisher's web site, multiple pages across different web sites, or any other group of destinations to which a user may navigate. Furthermore, the collection of historical information may be accomplished other than by the client program 115, such as by analysis of browser cookies, or by observing network traffic or other evidence of user behavior. Accordingly, other implementations are within the scope of the following claims.

What is claimed is:

1. A method performed by a data processing system for traversing a data structure to generate a filtered subset of data structures, the method comprising:

identifying a target network address for placing content;
accessing data structures that each represent time-ordered sequences of network addresses that have been accessed by viewers of the content;
generating a filtered subset of the data structures by:
  traversing the data structures to identify a subset of the data structures that represent the target network address previously identified; and
  reducing a processing time of analyzing other network locations accessed by viewers by filtering the data structures of the subset to comprise: (i) a data structure representing the target network address, (ii) other data structures representing other network addresses that have been accessed by the viewers within a threshold amount of time before the target network address is accessed by the viewers, and (iii) other data structures representing other network addresses that have been accessed by the viewers within a specified amount of time after the target network address is accessed by the viewers, including omitting from the filtered subset at least some network addresses that were accessed outside of the specified amount of time;
analyzing each other network address represented by the filtered subset to determine a frequency with which each of the other network addresses are represented in the filtered subset;
identifying one of the other network addresses represented in the filtered subset that occurs with increased frequency in the time-ordered sequences that include the target network address previously identified, relative to frequencies at which remaining other network addresses represented in the filtered subset occur in the time-ordered sequences that include the target network address previously identified;
selecting, by one or more processors, the one of the other network addresses identified as an alternate target network address for placing the content based on the increased frequency of the one of the other network addresses in the time-ordered sequences that include the target network address; and
outputting data indicative of the alternate target network address as a selected network address for placing the content based on the increased frequency of the one of the other network addresses in the time-ordered sequences that include the target network address.

2. The method of claim 1, wherein the data structures representing the time-ordered sequences of network addresses comprise historical data about activity involving the target network address from a repository of historical data.

3. The method of claim 1, wherein the alternate target network address comprises a first alternate target network address, wherein the target network address comprises a first target network address, and wherein the method further comprises:
  comparing a first time value associated with the first target network address to a second time value of a second target network address in the time-ordered sequences; and
  selecting, based on comparing the first time value and the second time value, the second target network address as a second alternate target network address for placing the content.

4. The method of claim 1, wherein the target network address comprises at least a selected network address or a group of selected network addresses.

5. The method of claim 1, wherein the target network address comprises at least one group of network addresses that comprises a selected network address.

6. The method of claim 1, wherein one or more of the time-ordered sequences are associated with a group of network addresses comprising:
  network addresses having an associated time before an associated time of the target network address; and
  network addresses having an associated time after the associated time of the target network address.

7. The method of claim 1, wherein the target network address comprises a first target network address, wherein each of the network addresses of the time-ordered sequences is associated with a range of time values, wherein the alternate target network address comprises a first alternate target network address, and wherein the method further comprises:
  comparing a range of time values associated with the first target network address to one or more ranges of time values that are each associated with a respective network address of the time-ordered sequences; and
  selecting, based on the comparing and by the one or more processors, information indicative of a second target network address as a second alternate target network address for placing the content.

8. The method of claim 1, wherein identifying the target network address comprises receiving an indication of a selected network address which is not available for content distribution.

9. The method of claim 1, wherein identifying the target network address comprises receiving an indication of a selected network address included in a competitor's web site.

10. The method of claim 1, wherein the alternate target network address comprises a first alternate target network address, and wherein the method further comprises:
  updating one or more of the time-ordered sequences of network addresses with activity involving the target network address;
  selecting, based on updating, a second alternate target network address; and
  outputting information indicative of the second alternate target network address as the selected network address for placing the content.

11. The method of claim 1, wherein the content comprises an advertisement.

12. A system for traversing a data structure to generate a filtered subset of data structures, the system comprising:
  one or more processors; and
  one or more storage devices storing instructions that are executable by the one or more processors to perform operations comprising:
    identifying a target network address for placing content;
    accessing data structures that each represent time-ordered sequences of network addresses that have been accessed by viewers of the content;
    generating a filtered subset of the data structures by:
      traversing the data structures to identify a subset of the data structures that represent the target network address previously identified; and
      reducing a processing time of analyzing other network locations accessed by viewers by filtering the data structures of the subset to comprise: (i) a data structure representing the target network address, (ii) other data structures representing other network addresses that have been accessed by the viewers within a threshold amount of time before the target network address is accessed by the viewers, and (iii) other data structures representing other network addresses that have been accessed by the viewers within a specified amount of time after the target network address is accessed by the viewers, including omitting from the filtered subset at least some network addresses that were accessed outside of the specified amount of time;

analyzing each other network address represented by the filtered subset to determine a frequency with which each of the other network addresses are represented in the filtered subset;

identifying one of the other network addresses represented in the filtered subset that occurs with increased frequency in the time-ordered sequences that include the target network address previously identified, relative to frequencies at which remaining other network addresses represented in the filtered subset occur in the time-ordered sequences that include the target network address previously identified;

selecting, by one or more processors, the one of the other network addresses identified as an alternate target network address for placing the content based on the increased frequency of the one of the other network addresses in the time-ordered sequences that include the target network address; and outputting data indicative of the alternate target network address as a selected network address for placing the content based on the increased frequency of the one of the other network addresses in the time-ordered sequences that include the target network address.

13. The system of claim 12, wherein the data structures representing the time-ordered sequences of network addresses comprise historical data about activity involving the target network address from a repository of historical data.

14. The system of claim 12, wherein the alternate target network address comprises a first alternate target network address, wherein the target network address comprises a first target network address, and wherein the operations further comprise:

comparing a first time value associated with the first target network address to a second time value of a second target network address in the time-ordered sequences; and selecting, based on comparing the first time value and the second time value, the second target network address as a second alternate target network address for placing the content.

15. The system of claim 12, wherein the target network address comprises at least one group of network addresses that comprises a selected network address.

16. The system of claim 12, wherein one or more of the time-ordered sequences are associated with a group of network addresses comprising:

network addresses having an associated time before an associated time of the target network address; and network addresses having an associated time after the associated time of the target network address.

17. The system of claim 12, wherein each of the network addresses of the time-ordered sequences is associated with a range of time values, wherein the alternate target network address comprises a first alternate target network address, and wherein the operations further comprise:

comparing a range of time values associated with the first target network address to one or more ranges of time values that are each associated with a respective network address of the time-ordered sequences; and selecting, based on the comparing and by the one or more processors, information indicative of a second target network address as a second alternate target network address for placing the content.

18. The system of claim 12, wherein identifying the target network address comprises receiving an indication of a selected network address which is not available for content distribution.

19. The system of claim 12, wherein the alternate target network address comprises a first alternate target network address, and wherein the operations further comprise:

updating one or more of the time-ordered sequences of network addresses with activity involving the target network address;

selecting, based on updating, a second alternate target network address; and outputting information indicative of the second alternate target network address as the selected network address for placing the content.

20. A non-transitory computer readable medium storing instructions for traversing a data structure to generate a filtered subset of data structures, the instructions being executable by one or more processors configured to perform operations comprising:

identifying a target network address for placing content;

accessing data structures that each represent time-ordered sequences of network addresses that have been accessed by viewers of the content;

generating a filtered subset of the data structures by:

traversing the data structures to identify a subset of the data structures that represent the target network address previously identified; and reducing a processing time of analyzing other network locations accessed by viewers by filtering the data structures of the subset to comprise: (i) a data structure representing the target network address, (ii) other data structures representing other network addresses that have been accessed by the viewers within a threshold amount of time before the target network address is accessed by the viewers, and (iii) other data structures representing other network addresses that have been accessed by the viewers within a specified amount of time after the target network address is accessed by the viewers, including omitting from the filtered subset at least some network addresses that were accessed outside of the specified amount of time;

analyzing each other network address represented by the filtered subset to determine a frequency with which each of the other network addresses are represented in the filtered subset;

identifying one of the other network addresses represented in the filtered subset that occurs with increased frequency in the time-ordered sequences that include the target network address previously identified, relative to frequencies at which remaining other network addresses represented in the filtered subset occur in the time-ordered sequences that include the target network address previously identified;

selecting, by one or more processors, the one of the other network addresses identified as an alternate target network address for placing the content based on the increased frequency of the one of the other network addresses in the time-ordered sequences that include the target network address; and outputting data indicative of the alternate target network address as a selected network address for placing the content based on the increased frequency of the one of the other network addresses in the time-ordered sequences that include the target network address.

* * * * *

UNITED STATES PATENT AND TRADEMARK OFFICE
CERTIFICATE OF CORRECTION

| | |
|---|---|
| PATENT NO. | : 10,430,453 B1 |
| APPLICATION NO. | : 15/669227 |
| DATED | : October 1, 2019 |
| INVENTOR(S) | : Day et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 87 days.

Signed and Sealed this
Thirtieth Day of June, 2020

Andrei Iancu
*Director of the United States Patent and Trademark Office*